United States Patent [19]

Bates

[11] 4,086,880
[45] May 2, 1978

[54] ROTARY PRIME MOVER AND COMPRESSOR AND METHODS OF OPERATION THEREOF

[76] Inventor: Kenneth Clayton Bates, 28 Scenic Dr., Poughkeepsie, N.Y. 12603

[21] Appl. No.: 615,362

[22] Filed: Sep. 22, 1975

[51] Int. Cl.² ............................................. F02B 53/10
[52] U.S. Cl. ............................... 123/205; 123/229; 418/196; 123/218
[58] Field of Search ............... 123/8.27, 8.09, 8.43, 123/8.31, 8.33, 8.35, 8.13; 418/191, 196

[56] References Cited

U.S. PATENT DOCUMENTS

| | | | |
|---|---|---|---|
| Re. 27,191 | 10/1971 | Skrob | 123/8.09 X |
| 1,257,268 | 2/1918 | Martin | 123/8.27 |
| 2,198,130 | 4/1940 | Schweiger | 123/8.27 X |
| 2,571,642 | 10/1951 | Yancy | 123/8.27 X |
| 2,722,201 | 11/1955 | Muse | 123/8.27 |
| 2,869,522 | 1/1959 | Marean | 123/8.31 |
| 3,297,006 | 1/1967 | Marshall | 123/8.27 X |
| 3,612,735 | 10/1971 | Graham | 418/191 |
| 3,621,820 | 11/1971 | Newsom | 123/8.09 X |
| 3,777,723 | 11/1973 | Lundström | 123/8.47 |
| 3,863,609 | 4/1975 | Ikaraski | 123/8.43 |
| 3,863,610 | 2/1975 | Spinnett | 123/8.27 |

*Primary Examiner*—Clarence R. Gordon
*Attorney, Agent, or Firm*—Dale A. Bauer

[57] ABSTRACT

A readily reversible, rotary type internal combustion engine which is selectively operable as a compressor and capable of several basic modes of operation, wherein an expansible combustion chamber or volume cyclically initiated from zero volume is chargeable, directly from a contractible compression volume, with compressed gaseous fluids in real-time as the combustion chamber is cyclically formed and expands from a selectively small volume, said volumes being formed within a housing between intermeshing rotors. The flow of compressed and expanding gases within the apparatus is controlled primarily by said rotors.

29 Claims, 19 Drawing Figures

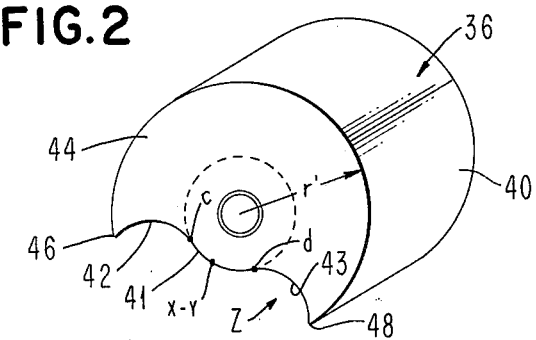
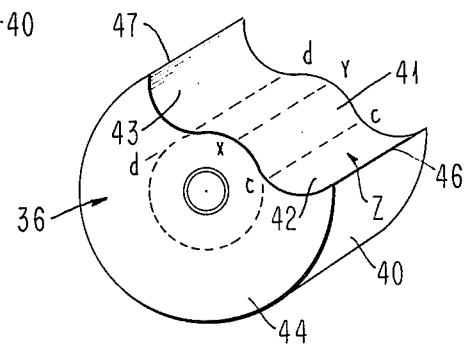
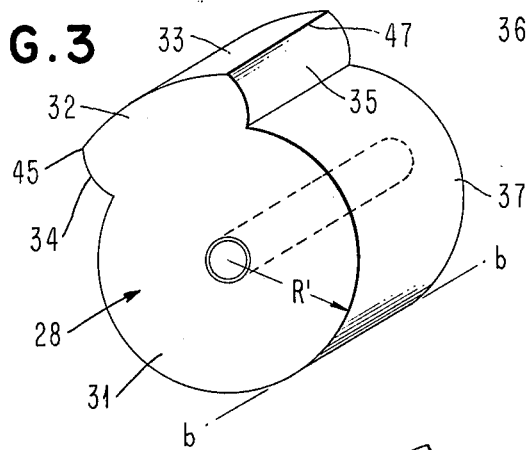
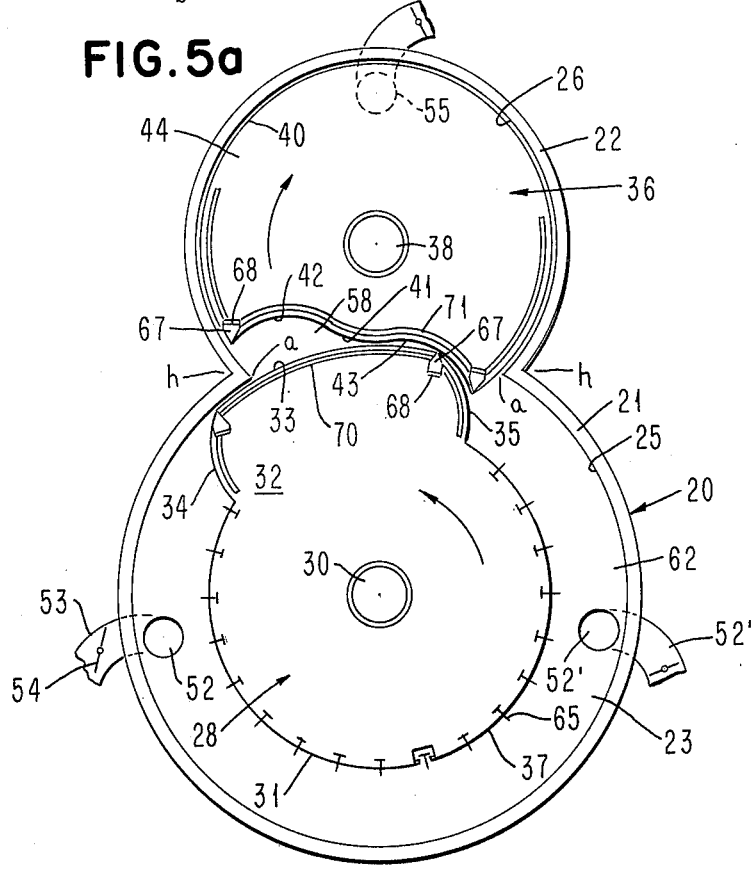

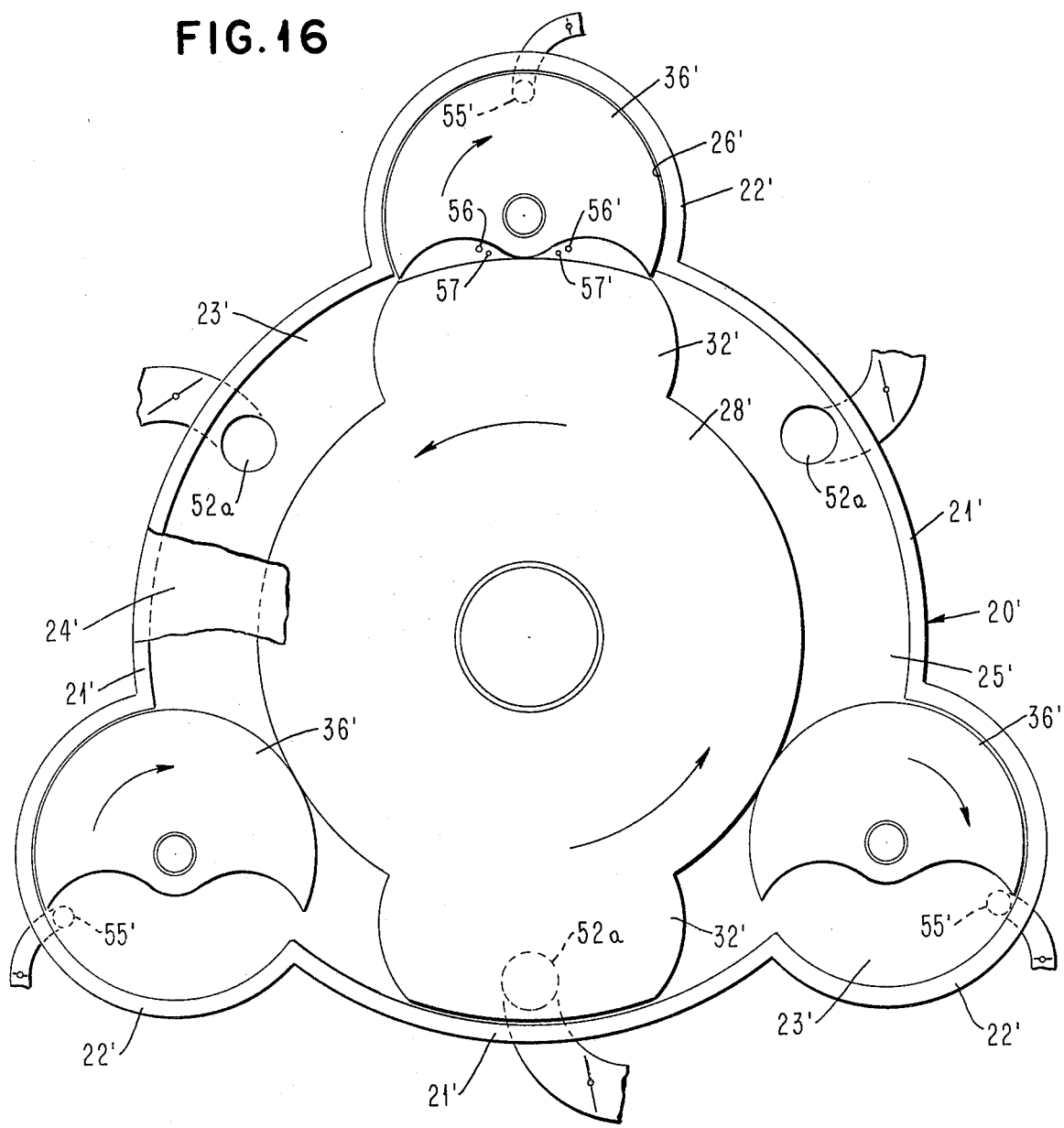

ROTARY PRIME MOVER AND COMPRESSOR AND METHODS OF OPERATION THEREOF

This invention relates to apparatus adapted for use as either a power generating prime mover or, when externally driven, as a gaseous compressor, and to modes of operation thereof as an internal combustion engine.

An object of the present invention is to provide rotary apparatus adapted for use in prime movers, compressors and the like and embodying a novel combination of intermeshing rotors which cooperate in a novel manner during simultaneous rotation thereof in a hollow housing to repetitively create closed expanding and contracting volumes within the housing.

Another object of the invention is to provide a novel rotary internal combustion engine comprising at least two intermeshing rotors which are so constructed that during each power pulse the expanding gases function to apply torsional force successively and directly to both said rotors to drive the same in opposite directions.

A further object of the invention is to provide a novel rotary type internal combustion engine comprising novelly constructed intermeshing rotors wherein each rotor functions successively as the compression rotor, as the power rotor, and as a fluid pressure balanced rotary divider and fixed reaction surface during each cycle of operation.

Another object is to provide a rotary engine of the above type wherein each rotor is integrally connected to a power output shaft and wherein the rotors are drivably connected for timed or synchronous rotation.

A still further object is to provide a novelly constructed internal combustion engine which lends itself readily and selectively to stratified charging, to stratified combustion, and to operation with a variable volume pre-combustion chamber which supplements the main or primary combustion chamber.

Still another object is to provide a novel rotary type engine which is so constructed that partially burned residual gases from the combustion chamber may be selectively recirculated and reintroduced into the combustion chamber with a fresh combustible charge without appreciable loss of pressure or temperature, without the use of additional or external accessories, and without exerting a negative torsional force against rotor rotation.

It is also an object of the invention to provide an engine which is readily reversible and which may be selectively and efficiently operated as either a spark ignition or compression ignition engine.

Another object is to provide a highly efficient rotary type combustion engine wherein the entire energy of the burning expanding gases in the combustion chamber may be exerted on the rotors to produce only positive torque thereon.

The invention also contemplates a novelly constructed rotary internal combustion engine the cyclic functioning of which is on a four phase cycle wherein the intake, compression, power and exhaust phases overlap and occur during selective arcs of the revolving motion of radial pistons or vanes on intermeshing rotors.

A further object is to provide a novel rotary internal combustion apparatus wherein gases are compressed and ignited in separate closed spaces cyclically formed by intermeshing rotary elements and wherein said spaces may be controlably connected to permit the flow of compressed gases there-between during the final stage of contraction of the compression space and the initial stage of formation and expansion of the combustion space, and wherein both spaces may be utilized successively or simultaneously as combustion chambers and either space may be advantageously used as a pre-combustion chamber.

Another object is to provide a novel internal combustion engine which embodies a contractible pre-combustion chamber from which the flame front is both mechanically and fluid-pressure projected into the main combustion chamber.

Still another object is to provide a rotary engine that is novelly so constructed that the moment arm through which gaseous pressure is applied to exert torsional force upon a power output shaft increases in length as the combustion chamber expands and combustion therein progresses.

A further object is to provide novel apparatus for compressing an entrapped fluid, such as air or a combustible gaseous fuel-air mixture, to a select state of pressure, temperature and volume before release thereof from the compression chamber.

Another object of the invention is to provide novel means in an internal combustion engine whereby a gaseous medium is compressed and supplied to the combustion chamber directly from the compression chamber which contracts to zero volume as the combustion chamber expands.

It is a further object to provide internal combustion apparatus wherein a selective quantity of a gaseous medium in excess of that required for combustion may be taken into the compression chamber and compressed during each cycle of operation to be utilized as a fluid sealing, after-burning or fluid bearing medium. A form of supercharging is thus provided which affords selective control of the pressure to which the gases may be compressed.

Rotary engines constructed in accordance with the invention operate with high volumetric and thermal efficiency, have exceptional power to weight ratio, permit advantageous internal after-burning of residual gases, and emit comparatively low volumes of atmosphere polluting gases.

A further object is to provide novelly constructed rotary apparatus of the above type wherein the rotating parts have pure rotary motion without orbital, planetary or eccentric motion.

Another object is to provide novel simplified rotary apparatus which is so constructed that balancing and inertia problems are minimized even at turbine-like rotor speeds.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

In the drawings, wherein like reference characters refer to like parts throughout the several views, FIG. 1 is a somewhat diagrammatic illustration, with some optional features eliminated in the interest of clarity, of a two-rotor, single expansion chamber form of apparatus embodying the invention, the transverse portion A being a front elevation as viewed from the left of FIG. 4, the portion B being a front elevation with the housing wall broken away, and the portion C being a sectional view taken on line 1—1 of FIG. 4 with portions of the rotors broken away at D and E;

FIGS. 2 and 2a are isometric views, on a reduced scale, of the upper rotor shown in FIG. 1;

FIG. 3 is an isometric view, on a reduced scale, of the lower rotor shown in FIG. 1;

FIGS. 5 to 13 are end elevation views like FIG. 4, on a reduced scale, showing the rotors in successive positions attained during one complete revolution thereof, with added mechanical and gaseous pressure sealing means being shown in FIG. 5a;

FIG. 16 is an end view similar to FIG. 4 of a modification having a multiplicity of expansible combustion chambers and contractible compression chambers.

Figure 4:
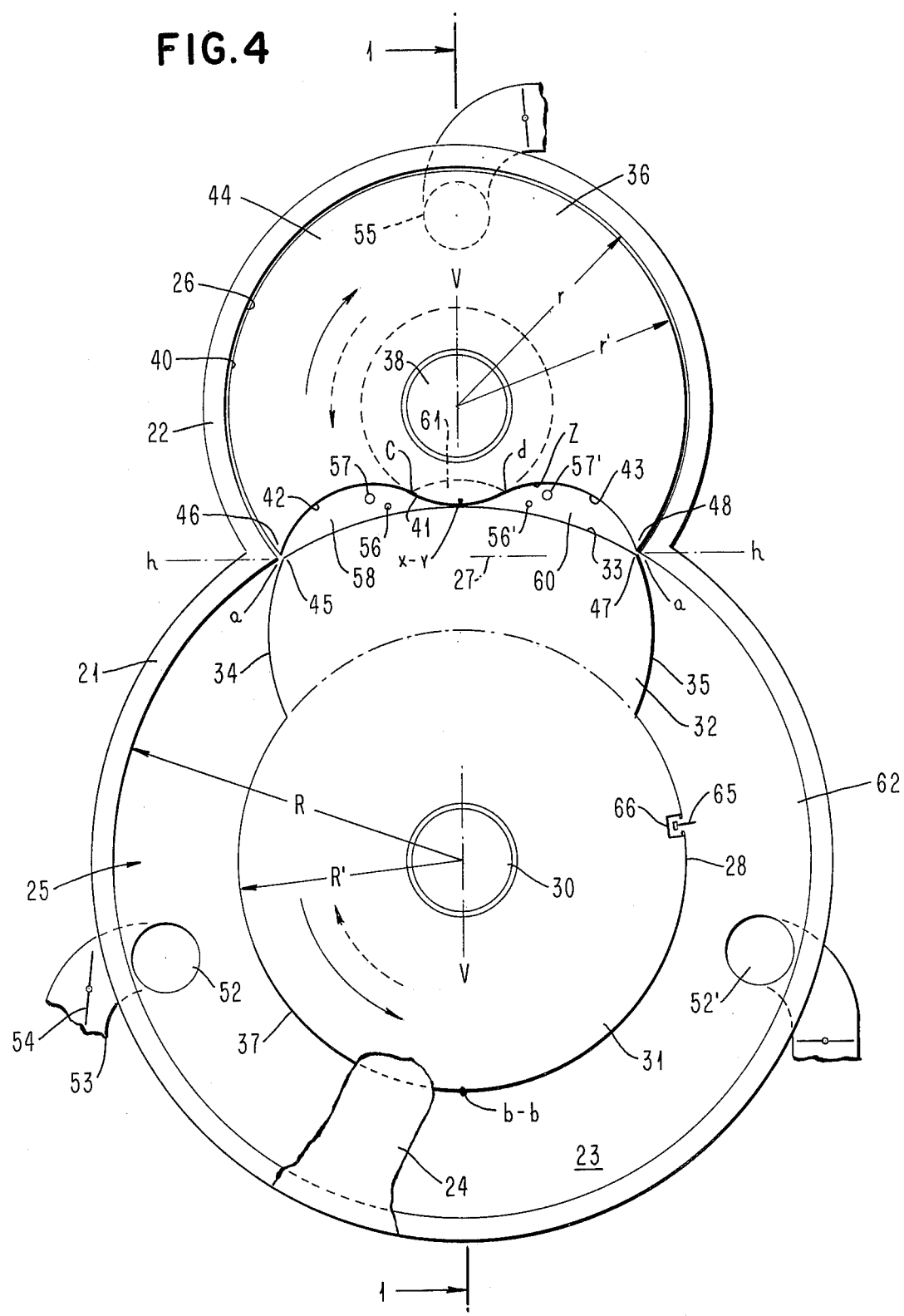
FIG. 4 is an end elevation view, with the end plate and gearing removed, taken on line 4—4 of FIG. 1 with the meshing rotors in postion to form a tubular contracting compression volume and a tubular expanding combustion chamber bounded only by the rotors and the end plates of the housing.

As illustrated in the drawings, by way of example, my novel apparatus may comprise a hollow housing 20 which includes a central tubular casing member made up of two major segments of cylinders 21 and 22 that have spaced parallel axes and are integrally or otherwise suitably joined together at the horizontal plane h—h, as viewed in FIG. 4. The housing further includes closure plates or end walls 23 and 24 suitably secured across the ends of said central casing member to form segmental cylindrical chambers 25 and 26 which communicate one with the other through the rectangular opening or passage 27 bounded on two sides by the apexes a, a at the junctions of the inner walls of cylindrical segments 21 and 22.

As shown, chamber 25 has a radius R which is selectively greater than the radius r of chamber 26. A rotor 28 within and coaxial with chamber 25 is rotatably supported in any suitable known manner, such as by shaft means 30 projecting into or through bearings in end plates 23 and 24. As best seen in FIGS. 3 and 4, rotor 28 comprises a cylindrical hub portion 31 having a radius R', appreciably less than R, and an axially-extending, radially-projecting rib, vane or piston portion 32. The outermost face 33 of the latter is a circular arc, segmental cylindrical surface, the rectangular plan view or outline of which substantially registers with or matches the corresponding outline of passage 27 when the rotors are in the positions shown in FIG. 4. The circumferential, circular arc curvature of piston surface 33 has a radius slightly less than the radius R of chamber 25 so as to have a close running clearance with the segmental cylindrical wall surface of the latter. The ends of rotor 28 also have a close running clearance with end plates 23 and 24.

The oppositely-facing, generally-radially extending reaction faces 34 and 35 of piston 32 are convex volute arcuate surfaces, so formed with varying radii as to cooperate, in a novel manner to hereafter appear, with a second smaller rotor 36 within chamber 26. Rotor 28 may also be regarded and described as having a major segmental peripheral recess with convex volute arcuate end surfaces 34 and 35 connected by a convex circular arc segment 37 of the peripheral surface of hub portion 31 of the rotor. The thus constituted recess surface 34,37,35 forming part of the peripheral surface of rotor 28 is symmetrical with respect to the axially extending center-line b—b thereof parallel to the rotor axis.

Rotor 36 which is designed to mesh and cooperate in a novel manner with rotor 28 is mounted within and coaxial with segmental cylindrical chamber 26 on or integral with shaft means 38 rotatably supported in any suitable known manner, such as by bearings in end plates 23 and 24. A major peripheral, segmental cylindrical surface 40 of rotor 36 has a radius $r'$ only slightly less than the radius r of chamber 26 and thus has a close running clearance with the segmental cylindrical wall of said chamber. The sum of the radius $R'$ of hub portion 31 of rotor 28 and the radius $r'$ of the surface 40 of rotor 36 is substantially equal to the distance between the axes of rotors 28 and 36. Accordingly, rotor surfaces 37 and 40 will make tangential sealing engagement as the rotors rotate in opposite directions. (FIGS. 7 to 10).

An axially-extending, novelly-shaped recess Z is provided in one side of rotor 36 to permit meshing of the two rotors in a novel manner when the same are rotated in timed relation in opposite directions and while the piston portion 32 of rotor 28 is passing and projects through opening 27 through which chambers 25 and 26 communicate. The peripheral surface of rotor 36 within recess Z is symmetrical with respect to the axially extending center-line x–y thereof and comprises a convex central circular arc or segmental cylindrical surface 41, which is concentric with rotor 36, and concave volute arcuate segments 42 and 43 on opposite sides of said central convex surface 41. The latter intersects volute surfaces 42 and 43 along lines c—c and d—d, respectively. (FIG. 2a). Alternatively, the major portion of rotor 36 bounded by concave arcuate surfaces 42 and 43 and the peripheral arcuate surface 40 may be regarded and described as a vane or piston portion 44 of the rotor, the surfaces 42 and 43 being the oppositely disposed working or reaction surfaces comparable to faces 34 and 35 of piston portion 32 of rotor 28. When piston portion 44 is passing and projects through opening 27 to mesh with rotor 28, the segmental cylindrical surface 40 thereof will, as pointed out above, make tangential sealing engagement with the recess surface 37 of rotor 28 (FIGS. 7 to 10). It will be understood that the recesses in the rotors preferably, but not necessarily, extend the full axial extent of the rotors.

Figure 12:
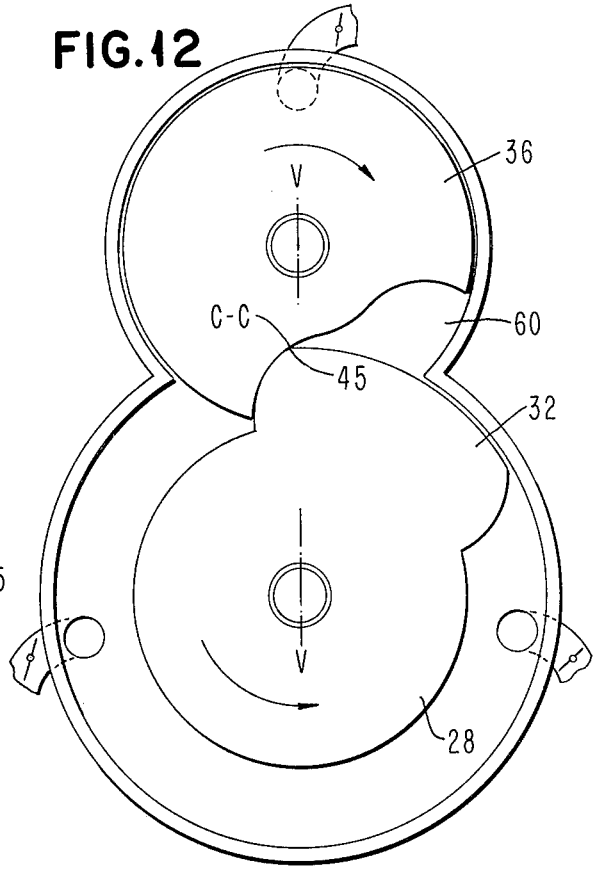

The variable radius curvature of the concave volute reaction surfaces 42 and 43 on rotor 36 and the variable radius curvature of the convex volute working on reaction surfaces 34 and 35 forming opposite sides of piston 32 of rotor 28 are such that, when the rotors are rotated from the positions of FIG. 4 at equal angular speeds in opposite directions, as indicated by dotted line arrows, the trailing apex or edge 45 of piston 32, at the intersection of surfaces 33 and 34, will maintain a close running or sealing relation with the trailing concave surface 42 of recess Z of rotor 36 and the trailing apex or edge 46 of rotor 36, at the intersection of surfaces 40 and 42, will maintain a close running relation with the trailing convex volute surface 34 of piston 32 on rotor 28. During this synchronous rotation of the rotors, the outer constant radius surface 33 of piston 32 maintains a combined sliding-rolling tangential contact with the convex, constant radius surface 41 of rotor 36 until the trailing apex or edge 45 of the piston 32 and the junction c—c of surfaces 41 and 42 reach the plane v—v containing the parallel axes of the two rotors (FIG. 12). If the direction of rotor rotation from the positions of FIG. 12 is now reversed, as indicated by solid line arrows, the leading edge 45 of piston 32 follows the leading volute surface 42 of recess Z, the leading apex edge 46 of rotor 36 follows leading volute surface 34 on the piston 32, and the constant radius surfaces 33 and 41 have combined rolling-sliding contact with each other.

Figure 1:
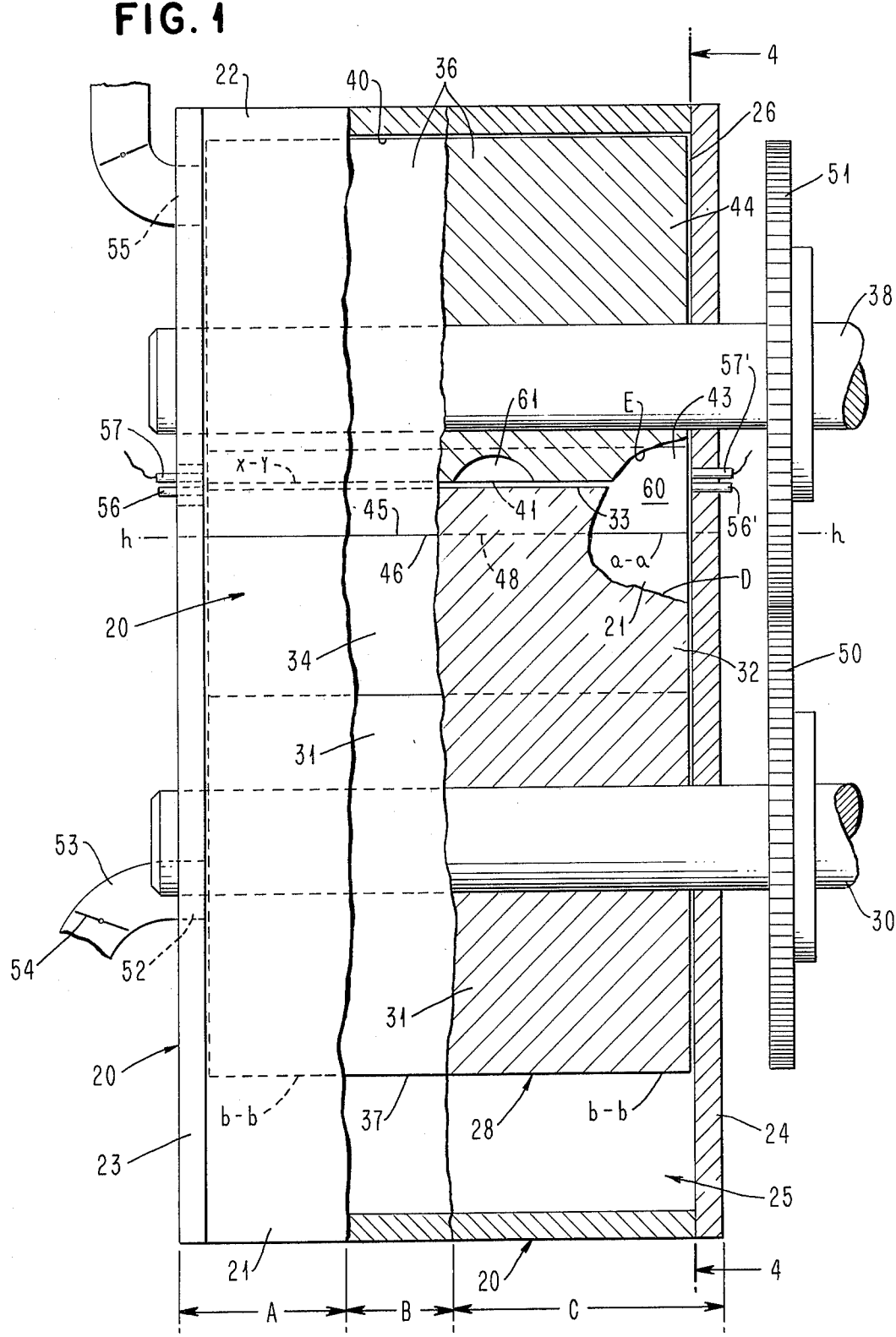
Figure 5:
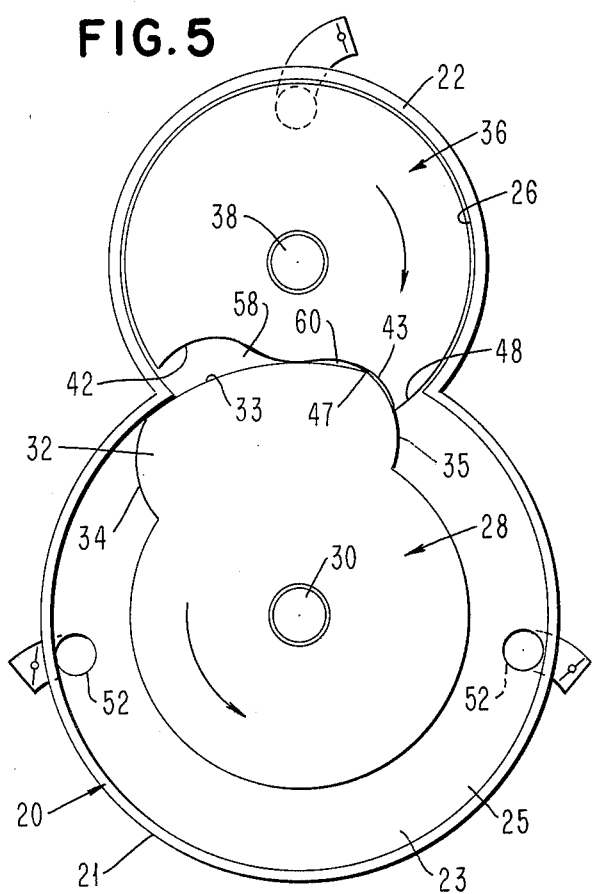
Figure 6:
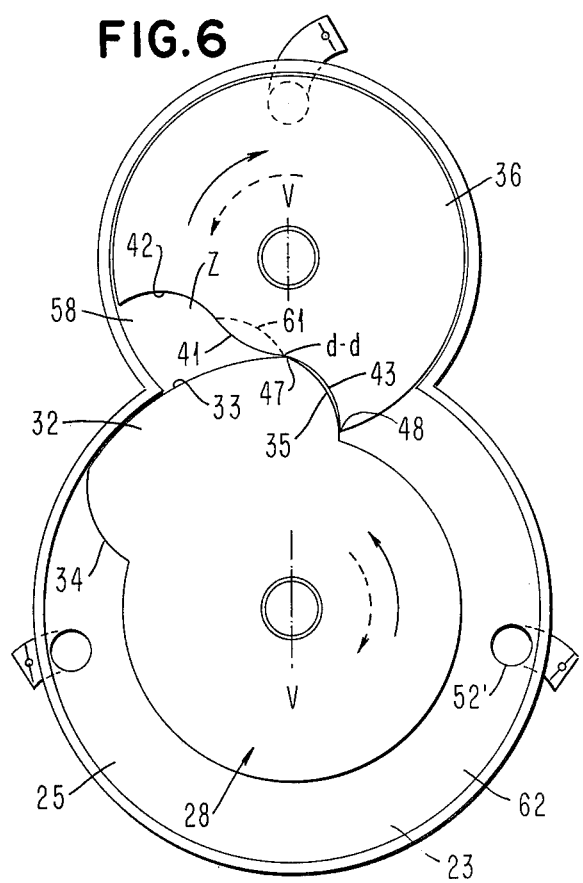

Similarly, as the rotors are rotated at equal angular speeds from the positions of FIG. 4 in the direction of the solid line arrows, the trailing apex or edge 47 of piston 32 has a running or sealing engagement with the trailing volute arcuate surface 43 of rotor 36, the trailing apex edge 48 of rotor 36 has running sealing engagement with the trailing volute face 35 of piston 32 (FIG. 5), and the constant radius piston surface 33 make a combined sliding-rolling engagement with the constant radius surface 41 of rotor 36 until the piston edge 47 and the juncture d—d of surfaces 41 and 43 reach the plane v—v (FIG. 6). If the rotation of the rotors is in the direction of the dotted line arrows from the positions of FIG. 6, the leading edge 47 of the piston 28 will move along the leading volute surface 43 of recess Z and the apex or edge 48 of rotor 36 will move along the leading convex volute surface 35 of piston 32 while rotor surfaces 33 and 41 make sliding-rolling engagement. During rotation of the rotors from the positions shown in FIG. 11 in the direction of the dotted line arrows, the circular or constant radius surfaces 37 and 40 of rotors 28 and 36, respectively, will make rolling tangential engagement with each other, as for example in FIGS. 7 to 10. The surfaces 37 and 40 are of equal circumferential extent and will also engage each other during corresponding angular portions of their rotation in the direction of the solid line arrows. Thus, rotors 28 and 36 cooperate in identical fashion during rotation in either direction, making the apparatus readily reversible. The required synchronous angular rotation of rotors 28 and 36 may be effected in any suitable known manner, such as by drivably connecting rotor shafts 30 and 38 with meshing gears 50 and 51 of equal diameters (FIG. 1).

In the preceding description the descriptive adjectives, leading and trailing, are associated with concave surfaces 42 and 43 as parts of the surface of recess Z in rotor 36. Thus, surface 42 of the recess leads surface 43 during clockwise rotation of rotor 36 (FIG. 4) and trails it during counter-clockwise rotation. Alternatively, when the outer peripheral portion of the rotor 36 is defined or described as the piston portion 44 of the rotor, as pointed out in the third preceding paragraph above, concave surface 43 is the leading or working surface of said piston portion during clockwise rotation thereof (FIG. 4) and concave surface 42 is the leading or working surface thereof during counter-clockwise rotor rotation.

For use when rotor 28 is rotating counter-clockwise, a combined inlet and exhaust port 52 for the space around hub 31 in in chamber 25 is provided in one or both end plates 23 and 24 and/or casing member 21. Preferably, but not necessarily, a conduit 53 is connected to port 52 and suitable known valve means, such as rotary or butterfly valve means 54, may be provided in said conduit to control flow of gases therethrough in either or both directions. The position of port 52 circumferentially of chamber 25 may be selectively varied in order to vary some of the operational characteristics of the apparatus, such as the compression ratio for example, which may be varied, between wide limits, the upper limit being considerably in excess of that attainable in known engines. An exhaust port 55 is also provided in one or both of end plates 23 and 24 and/or in the wall of casing member 22 for the exit of burned gases from the space in rotor recess Z within chamber 26. If desired, suitable valve means of known construction may be provided for closing port 55 or for limiting or varying the effective size thereof. In the interest of operational reversibility of the apparatus, port 55 is preferably, though not necessarily, centered on the plane v—v of the rotor axes. Alternatively, two such ports may be provided, one on each side of said plane for alternate use. Also in the interest of such reversibility, a second normally closed inlet-outlet port 52' may be provided at the side of rotor 28 opposite port 52 for use when rotor 28 rotates clockwise. One or the other of ports 52 and 52' will always be closed depending on the direction of rotation of rotor 28.

A suitable combustible fuel may be periodically injected into chamber 26 within recess Z of the rotor 36 through suitable known types of diagrammatically illustrated nozzles 56 and 56' (FIG. 4) mounted in either one or both end plates 23 and 24 and/or casing 22. Similarly, diagrammatically illustrated igniter means 57 and 57', such as spark plugs of known construction, may also be mounted in the vicinity of said nozzles. Suitable means of known construction (not shown) may also be provided for effecting and timing periodic injections of fuel through one or more of said nozzles, either simultaneously or in timed succession, and for effecting and timing periodic energization or firing of one or more of said ignitors either simultaneously or in timed succession. As an alternative to solid fuel injection, as described above, a fuel-air gaseous mixture may be fed into chamber 25 within the space provided by the recess in rotor 28 through port 52 or 52' from a carburetor (not shown). Also, as an alternative to spark ignition, compression ignition may be employed, as in diesel engines.

Figure 13:
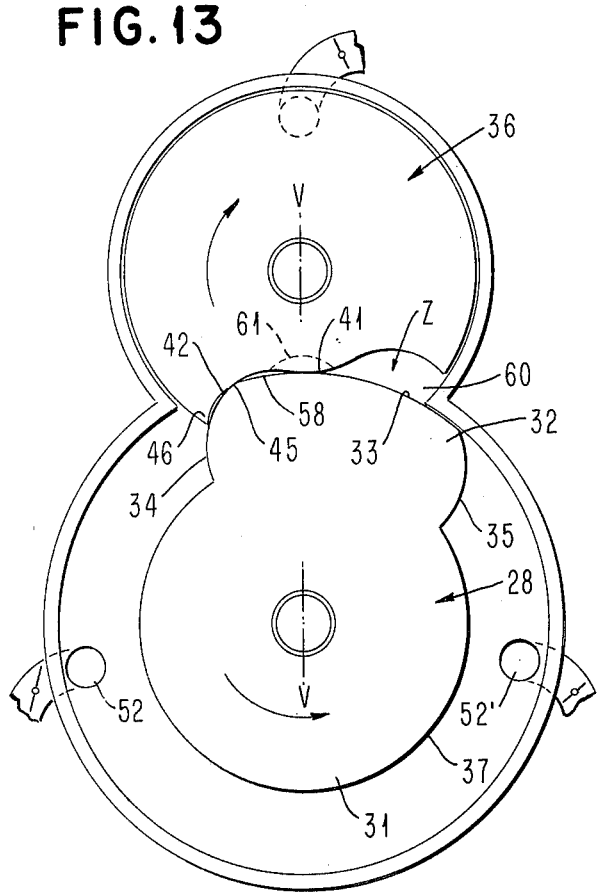

A novel and highly advantageous feature of the present invention resides in the fact that rotor 28 when rotating counter-clockwise (FIG. 4) cooperates with rotor 36 and end plates 23 and 24 during each revolution of the rotors (1) to form a closed, substantially gas-tight expanding volume or combustion chamber 58 between the rotors which may be initiated from zero volume and (2) to simultaneously form a closed, substantially gas-tight contracting compression volume 60 that may be initiated as a relatively large volume that can be selectively varied by the location of the inlet port 52 and reduced to zero volume, thereby affording the capability of selectively producing compressed gases at any of a very wide range of pressures. These volumes 58 and 60 are shown in FIGS. 4 and 13, for example, at intermediate stages of their expansion and contraction, respectively. If desired, the compression volume 60, as it approaches zero volume (FIG. 5), may be utilized as a supplemental or pre-combustion chamber. It will be understood that when the rotor rotation is reversed, i.e. when rotor 28 rotates clockwise, volume 58 becomes the contracting or compression volume and volume 60 becomes the expanding or combustion volume and inlet-exhaust port 52' is used in lieu of port 52.

Assuming counter-clockwise rotation of rotor 28 and clockwise rotation of rotor 36, expansible volume 58 is initiated from zero value as the leading apex edge 45 of piston 32 passes the plane v—v (FIG. 12) and begins its sliding sealing engagement with volute surface 42 (FIG. 13) and the constant radius outer face 33 of piston 32 engages the central constant radius surface 41 of the recess Z in rotor 36. Thus, as rotor rotation progresses, in the direction of the solid line arrows, from the positions shown in FIG. 12 consecutively through those shown in FIGS. 13 and 4 to 6, the closed volume 58 between the rotor surfaces 33 and 42 is progressively expanded from zero and the volume 60 between rotor surfaces 33 and 43 is progressively reduced or contracted and reaches zero value when the trailing apex edge 47 of the piston 32 reaches the plane v—v and is disengaged from volute surface 43 (FIG. 6). Inasmuch as the expanding combustion volume or chamber 58 is thus initiated from zero value, the same is not contaminated by any residual, partially burned gases from a preceding combustion.

At a selective, predetermined stage in the progressive formation and expansion of the combustion volume 58 or in the progressive contraction of the compression volume 60, these volumes are connected to each other by any suitable means to effect charging, in real time, of the combustion volume 58 with compressed gaseous medium, such as air or a fuel-air mixture, from the compression volume 60 at a pressure which, as pointed out above, may be varied between relatively wide limits by pre-selection. In the illustrated embodiment, the transfer means for the compressed gaseous medium comprises, by way of example, one or more transverse slots or other passages 61 in rotor 36. The effective ends or terminals of said slot are selectively located, usually on opposite sides of the axially extending center-line x-y of rotor surface 41. Thus, after the leading or left hand terminal (FIG. 13) of slot or passage 61 passes the plane v—v, the volumes 58 and 60 will be in communication through said slot until the trailing or right hand end of the slot passes plane v—v (FIG. 6). If the latter occurs before the compression volume is reduced to zero, the remaining compressed gases therein may be dispensed and utilized in a novel manner to be hereinafter described.

During a major portion of the rotation of rotors 28 and 36, the latter functions as a rotary divider (FIGS. 8 and 9) to divide the space around rotor hub 31 into a contractible compression volume 62 in advance of piston 32 and an expansible volume 63 trailing said piston. As more particularly pointed out hereinafter, trailing volume 63 when initially formed constitutes an expansible combustion volume (FIGS. 7 and 8) filled with burning gases to apply driving torque to rotor 28. This condition persists until piston 32 uncovers port 52 (FIG. 9) to thereby initially permit the exhaust of burned gases and thereafter the inflow of fresh gases.

The Novel apparatus thus illustrated and described is operable as a remarkably efficient internal combustion engine on a four phase cycle wherein the compression, power generation, exhaust and intake functions overlap and hence occur, in part simultaneously, during selective arcs of rotor rotation.

Compression Function

Assuming counter-clockwise rotation of the rotor 28 and clockwise rotation of rotor 36, as seen in FIG. 4, and starting with the rotors in the positions of FIG. 4, the mass of air or other gaseous medium which was drawn or driven under some outside pressure through inlet port 52 into the space in chamber 25 around rotor hub 31 is entrapped in volume 62 (FIG. 7) in advance of piston reaction face 34 and will be compressed in said space against the peripheral surface of rotor 36 as the rotors rotate through the positions of FIGS. 7 to 11. At a stage intermediate FIGS. 9 and 10 when apex 45 passes housing apex a, the space within recess Z of rotor 36 merges through opening 27 with the diminishing compression volume 62 in chamber 25. The merged volumes are then further contracted and the gaseous medium therein is further compressed, as heretofore described, in the compression volume 60 (FIGS. 10 to 13, 4 and 5). This volume diminishes to zero, as explained above, when the rotors reach the positions of FIG. 6. The ultimate pressure to which the gases may be compressed may be regulated by the circumferential positioning of the inlet port 52 to thus vary the initial and maximum volume of the compression space 62, or by suitably controlling flow through port 52 to thereby vary the mass of gaseous medium supplied to the compression volume 62. The illustrated apparatus may thus be used as a compressor when the rotors are externally driven through gears 50, 51.

Combustion of Power Generating Function

The power generating function of the apparatus occurs in part simultaneously with the final stage of the compression function. Thus, as pointed out above, when the rotors proceed in the direction of the solid line arrows from the positions shown in FIG. 12, an expansible combustion volume 58 is initiated and progressively expands as the rotors proceed through the positions of FIGS. 13 and 4 to 6. During this period the leading or left hand end of slot 61 moves into communication with expanding volume 58 and hence connects it with compression volume 60 to permit the flow of compressed gases into combustion volume 58 as the latter expands, i.e. in real time, and while the compression volume is simultaneously diminishing. The compressed gases are thus mechanically and fluid pressure driven through passage 61 into the combustion volume 58, thereby creating advantageous turbulence in the latter. The timing, duration and nature of the flow of gases from the compression volume 60 to the primary or main combustion volume 58 may be varied and controlled by varying the position, length, size and number of slots or passages 61.

Figure 7:
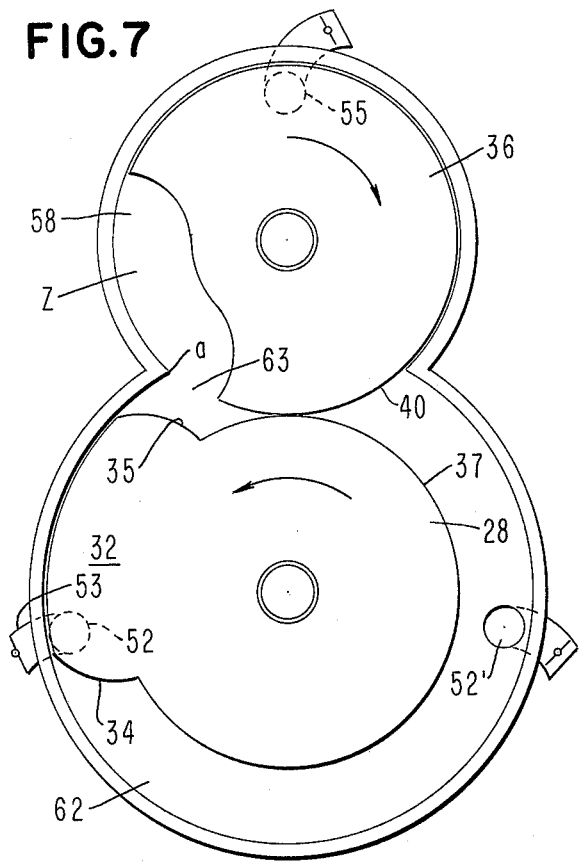

At a pre-selected time, combustible solid fuel may be injected through nozzles 56 into volume 58. This is not necessary however when the compressed gaseous medium is a combustible fuel-air mixture supplied through inlet port 52. The mixture of fuel and compressed gas is ignited, either by the heat of the compressed gas or by a timed spark at igniter 57. Initially the burning, expanding gases in volume 58 react against the peripheral surface 33 of rotor 28 and apply an effective clockwise driving torque to volute surface 42 of rotor 36. FIGS. 13 and 4 to 6. When now the trailing apex edge 47 of rotor piston 32 passes the plane v—v (FIG. 6) and moves away from rotor 36, the entire surface of rotor 36 within recess Z becomes exposed to the burning expanding gases, thereby balancing the torsional forces tending to drive rotor 36 in opposite directions. However, at this time, the burning gases effectively heat against the peripheral surface of rotor 36 to apply an effective counter-clockwise driving torque to the trailing reaction face 35 of rotor 28 (FIGS. 7 and 8).

Figure 8:
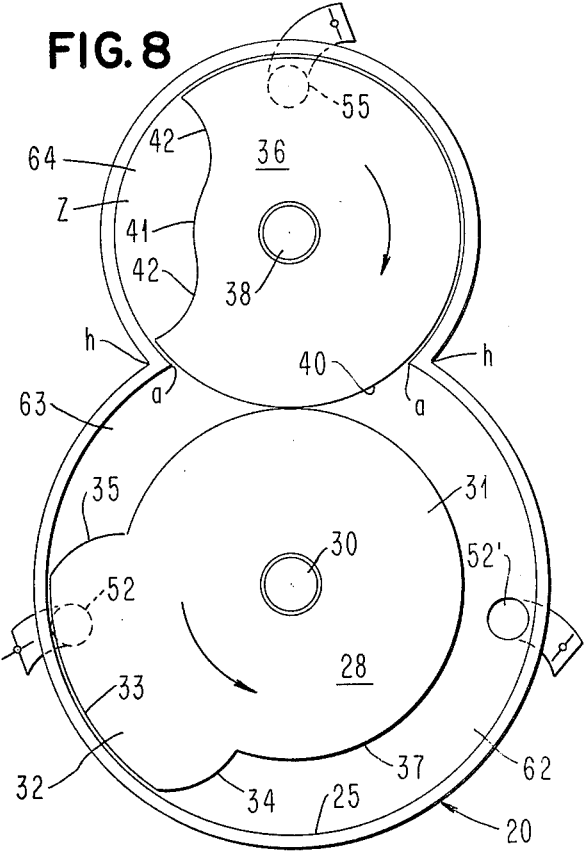

When the rotors attain the positions illustrated in FIG. 8, the expanding combustion volume divides into a static closed volume 64 within the recess Z in rotor 36 and volume 63 in chamber 25 which continues to expand with torque being applied to rotor 28 until piston 32 passes and begins to uncover port 52. Thus, during each cycle of operation the power generating force of the expanding gases is initially applied to rotor 36 and then to rotor 28.

The engine may be selectively operated in accordance with a plurality of different modes. If desired, combustion during each cycle may be initiated by igniting the gases in volume 60 (FIG. 5) which then functions in the nature of a pre-combustion chamber communicating through passage 61 with the main or primary combustion volume 58. In some cases it may be desirable to energize both the ignition means 57 and 57' either successively or simultaneously. It may be advantageous to provide and ignite either a lean or a rich mixture combustible charge in the contracting volume 60 (FIG. 5) and either a rich or lean mixture combustible charge in the expanding volume 58. In these cases, it may be preferable to ignite the rich mixture first. Pre-ignition of a rich mixture charge in the diminishing volume 60 results in mechanical propulsion or injection of the burning rich mixture from volume 60 into the lean mixture in expanding volume 58, thereby providing advantageous stratified combustion. The pre-ignition chamber or volume is in a sense absorbed into the expanding primary combustion chamber or volume 58 during each cycle of operation. In most modes of operation, the gaseous medium in the contracting volume 60 (FIG. 5) is mechanically injected into expanding volume 58 simultaneously with the on-going combustion of the charge in the latter to thereby provide stratified combustion. When ignition and hence combustion is initiated in expansible volume 58 no negative torsional force is applied to the rotors and the moment or torque arm increases advantageously as the combustion chamber volume increases. In the event compression volume 60 is to be used as a supplemental or pre-ignition chamber, it is preferable to locate the trailing terminal of slot 61 in the trailing half of the segmental cylindrical surface 41 of recess Z in rotor 36.

Exhaust and Intake Functions

Figure 9:
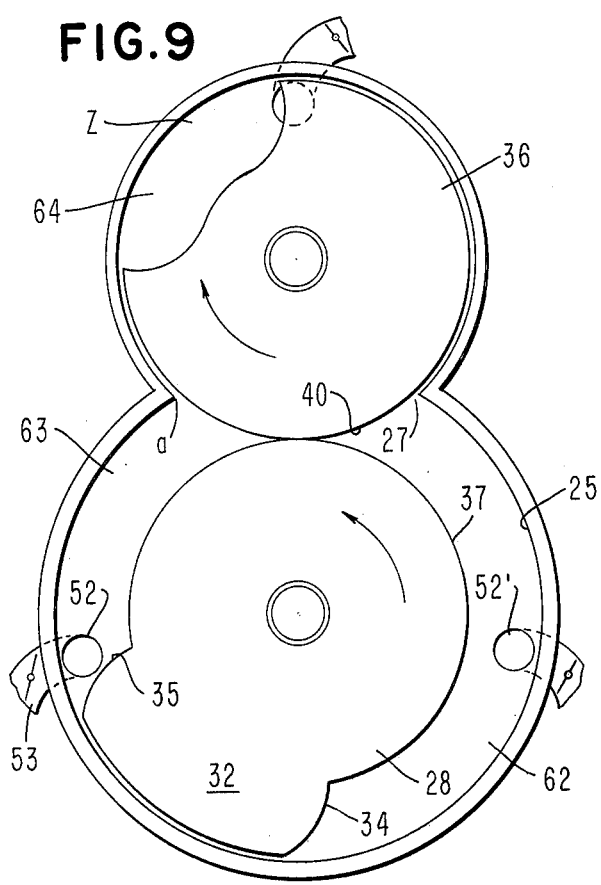
Figure 10:
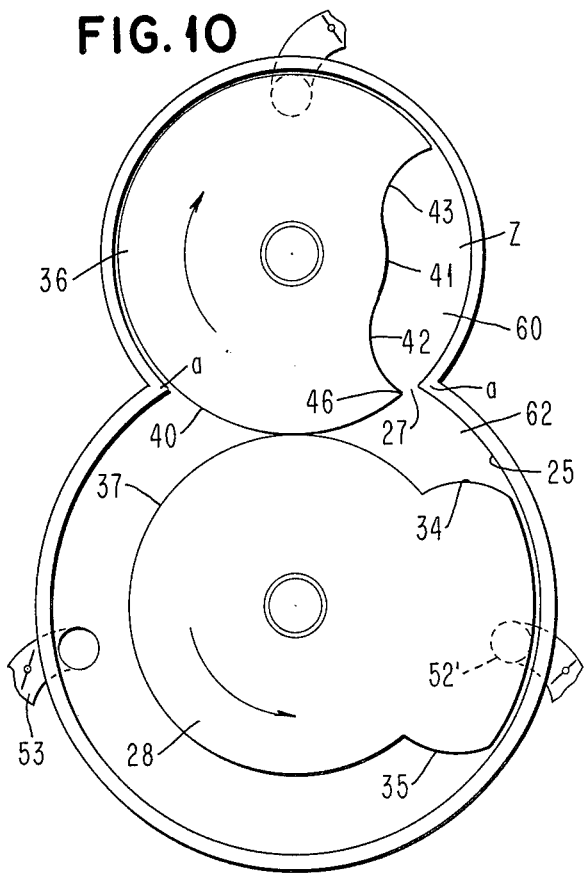
Figure 11:
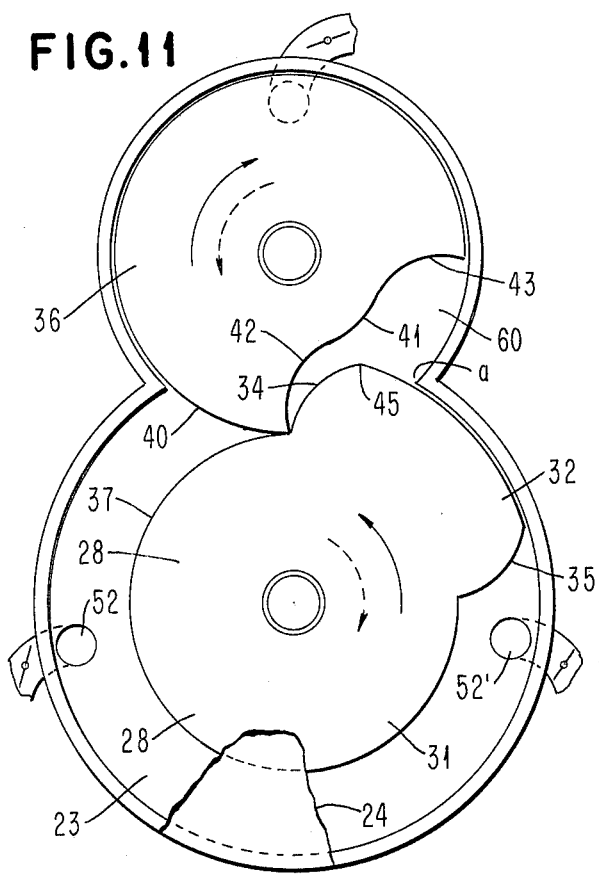

At the end of the power generating function, i.e. when piston 32, moving counter-clockwise (FIG. 8), moves across and begins to open port 52, a portion of the hot residual gases in volume 63 (FIG. 9) are then exhausted to the atmosphere through port 52 and the remainder are advantageously mixed and compressed with the new in-coming fresh charge of air or fuel-air mixture for a subsequent combustion phase. At about the same time, rotor 36 will uncover exhaust port 55 for discharging gases from recess Z in rotor 36 (FIG. 9). If desired port 55 may be wholly or partially closed externally of the housing so that all or part of the hot residual gases under pressure in said recess volume 64 will be advantageously carried around by rotor 36 and mixed with the gases undergoing compression in volume 62 (FIG. 10). The residual gases in volume 64 are under substantial pressure at high temperature when they are ultimately mixed with the partially compressed gases in volume 62 (FIG. 10). This utilization of pressurized, high temperature residual gases contributes advantageously to the high efficiency of the engine.

The intake of a fresh charge of air or fuel-air mixture into chamber 25 around hub 31, begins after the piston 32 moves across and uncovers port 52 (FIG. 9) and continues until said piston moves into registry with opening 27 (FIG. 4). The fresh charge is drawn in by suction behind the trailing face 35 of piston 32 and, if desired, the same may be driven in by external pressure in any known manner. Accordingly, the novel structure of the invention performs all four of the compression, power generation, exhaust and intake functions during each revolution of the rotors. During each of various phases of each revolution or cycle of operation two or three of these functions are being simultaneously performed.

The embodiment of the invention illustrated in FIGS. 1 to 13 and described above may be conveniently thought of as a single combustion chamber engine, akin to known single cylinder engines, except that the present engine advantageously completes a full 4-phase cycle of operation without any reversal of motion during each revolution of the power output shaft. The invention may of course be incorporated in plural combustion chamber engines, a three combustion chamber engine being shown, by way of example, in FIG. 16. This engine comprises a hollow housing 20' consisting of three minor cylindrical segments 21' connected by three major segments 22' of smaller cylinders to form a central cylindrical chamber 25' that communicates with three equally spaced segmental cylindrical chambers 26' which correspond with chambers 25 and 26, respectively, of the embodiment of FIG. 4. The ends of housing 20' are closed by end plates 23' and 24', the latter of which is largely broken away in the drawing. A central rotor 28' with two diametrically disposed piston portions 32' corresponds with the rotor 28, 32 and the rotor 36' in each chamber 26' corresponds with rotor 36. Any suitable known means, such as a gear train (not shown) may be provided for constraining rotors 28' and 36' to rotate in timed relation in such manner that during each revolution of rotor 28' in either direction, each rotor 36' will rotate two revolutions in the opposite direction. During each revolution of rotor 28', each of the pistons 32' thereon will mesh and cooperate with each of the rotors 36' in the same manner that piston 32 cooperates with rotor 36 as heretofore described.

Fuel injectors and igniters corresponding to injectors 56, 56' and igniters 57, 57' may be provided, as diagrammatically shown, in each of the chambers 26'. A combination intake-exhaust port 52a corresponding to port 52 is provided in one or both end plates 23' and 24' and/or in housing segment 22' midway between pairs of adjacent rotors 36'. If desired, however, each such port may be replaced by a pair of spaced ports located closer to the adjacent rotors 36', one of each said pair of ports being closed while the other is open, depending on the direction of rotor rotation. In either event the rotors will be reversible. Suitable exhaust ports 55' corresponding to port 55 may also be provided for chambers 26' in housing segments 22'. It will thus be seen that the fundamental operation of various multi-chamber embodiments of the invention is the same as that of the single chamber embodiment. In the multi-chamber engine illustrated as exemplary there are six combustion or power generating pulses during each revolution of rotor 28', one for each 60° of rotation of said rotor, since each of the two pistons 32' cooperates with each rotor 36' during each revolution of rotor 28'.

If desired, conventional sealing means, such as rings or strips (not shown), may be conventionally mounted in grooves in the end or flank surfaces of rotors 28 and 36 adjacent the peripheries thereof. Said rings or strips may extend from said grooves to yeildingly, lightly engage the inner surfaces of end plates 23 and 24. Also, as diagrammatically shown in FIGS. 4 and 5a, a plurality of axially-extending, circumferentially-spaced sealing strips 65 may also be conventionally mounted across the periphery of rotor hub 31 for slight radial movement and hence yeilding engagement with the peripheral surface 40 of rotor 36. As shown, strips 65 may be T-shaped to be constrained against centrifigal force within suitably shaped grooves 66 in rotor 28, 31 (FIG. 4).. Strips 65 may be urged radially outwardly by suitable resilient means, if desired.

Figure 14:
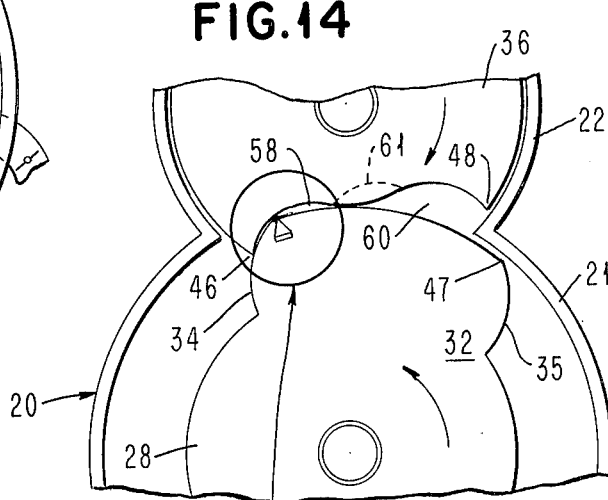
FIG. 14 is a detail end elevation view like FIG. 13 showing an optional apex sealing means on the lower rotor.
Figure 14A:
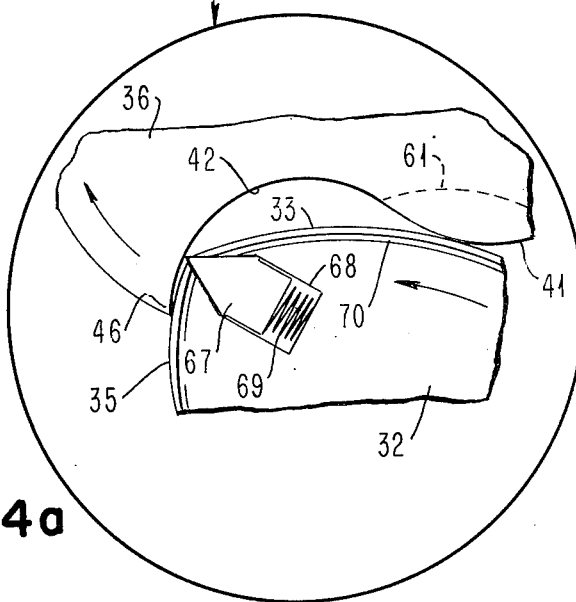
FIG. 14a is an enlarged view of the encircled portion of FIG. 14.

To provide greater assurance against leakage of gases from the compression and combustion volumes 60 and 58, novel mechanical and/or fluid pressure seals may be optionally provided. The mechanical seals may comprise sealing strips novelly mounted to constitute the rotor apexes 45, 47 and/or 46, 48. By way of example, an end elevation view of one such mechanical apex sealing means is illustrated in FIGS. 5a, 14 and 14a. As shown in enlarged detail in FIG. 14a, said sealing means comprises an axially extending wedge-shaped strip 67 in a similarly wedge-shaped channel 68 milled or otherwise created in piston portion 32 of rotor 28 at the apex 45 thereof. In providing channel 68, the outermost tip of apex 45 is removed, leaving an open slot through which the outermost tip or edge of strip 67 may project. Suitable resilient means 69 urges strip 67 radially outwardly to a terminal position positively determined by engagement of the correspondingly tapered or converging surfaces of the strip 67 and groove 68. In this terminal position the outer or apex edge of the strip projects from said slot a slight distance, preferably a distance barely sufficient to make sliding engagement with the inner surface of housing portion 21 and hence a yeilding engagement with surface 42 in recess Z of rotor 36 (FIG. 13). Comparable sealing means may be mounted to constitute rotor apexes 46, 47 and 48 to insure tight seals where these apexes engage rotor surfaces 34, 43 and 35, respectively FIGS. 13 and 5).

Figure 15:
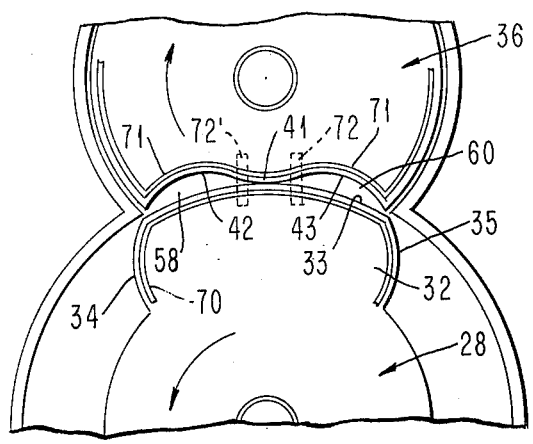
FIG. 15 is a detail end elevation view like FIG. 4, on a reduced scale, showing optional fluid pressure sealing means.

If desired, novel fluid pressure sealing means may be optionally provided, either alone or as a supplement to the above described mechanical sealing means. As illustrated in FIGS. 5a and 15, narrow grooves 70 and 71 may be provided in the end walls of rotors 28 and 36, respectively, near the outer face 33 of piston 32 and the peripheral rotor surface in recess Z of rotor 36. Access to said grooves from compression chamber 60 is provided by a short transverse groove 72 in one or both end plates 23 and 24 (FIG. 15). Grooves 72 are so positioned that the lower ends thereof will overlap grooves 70 in the flanks of rotor piston 32 and the upper ends thereof will overlap the flank grooves 71 in rotor 36 as the latter approaches the position shown in FIG. 4. Thus, a small volume of high pressure compressed gases will flow from compression volume 60, through grooves 72 in end plates 23 and 24 into grooves 70 and 71 in the rotor flanks. From the latter grooves, the primary flow of the high pressure gases thus entering grooves 70 and 71 is through the narrow clearance space between the ends of the rotors and the housing end plates into combustion space 58, thereby providing a fluids barrier to the flow of gases out from the combustion space while supplying said space with additional combustion supporting gases. This additional supply of such gases, including gases which are entrapped in grooves 70 and 71 and flow into the expanding combustion space as the pressure therein subsides, provides advantageous after-burning of the unburned HC, thereby reducing the polluting effect thereof in any exhaust and increasing the temperature of any gases carried over in volume 64 for introduction into compression volume 60 and hence into the next combustible charge for combustion chamber 58 (FIGS. 8 to 10). This latter utilization of the gases from static volume 64 (FIG. 8) is particularly advantageous when the compression ignition mode of operation is elected. When the foregoing fluid pressure sealing concept is utilized, fresh gases are preferably supplied to compression volume 62 in excess of those required for the combustion function. It may also be advantageous to so position transfer passage 61 so that communication of volumes 58 and 60 therethrough is cut-off before volume 60 is fully reduced to zero value. The gases then remaining in volume 60 are forced at very high pressure through grooves 70, 71 and 72 into combustion chamber 58 to provide the advantageous results mentioned above. If desired, channels 70 and 71 may be connected with the grooves 66 of the mechanical apex seals. The high pressure gases would exit via the apex seals to provide a blocking fluid film between the apex and the surface engaged by it. For reversibility, a second set of grooves 72' may be similarly located in end plates 23 and 24 on the other side of plane $v$—$v$ and suitable means, such as sliding blocks (not shown), may be employed to disable the set or sets of grooves 72, 72' not being utilized.

There is thus provided a novel rotary apparatus which comprises a plurality of intermeshing rotors rotatably mounted in communicating, segmental cylindrical chambers of a hollow housing, said rotors being mechanically so connected as to rotate in predetermined timed relation to each other and being novelly formed with a novel arrangement of circular-arc and non-circular-arc peripheral surfaces, whereby the rotating rotors cooperate with each other and said housing to repetitively generate a totally new sealed progressively-expansible volume that may be utilized as a combustion chamber and to repetitively initiate a sealed contractible compression volume and progressively reduce the latter to a selected small or zero volume. An initial portion of the expansion of each expansible volume and a near final portion of the contraction of each compression volume advantageously occur simultaneously whereby compressed gases may be flowed at selected pressures and temperatures, in real time, from the contracting volume to the simultaneously expanding volume through suitable connecting passage means which may be advantageously embodied in and controlled by the rotating rotors. During such transfer, the compressed gases which may be combustible or rendered so by the injection of selective quantities of a combustible fuel into one or both of said volumes, may be advantageously ignited by either spark or compression ignition in one or both volumes, either simultaneously or in timed succession, whereby the expanding volume functions as a main combustion chamber and the contracting volume is functionally converted to a contracting pre-combustion chamber from which burning gases are driven both mechanically and by fluid pressure into the main combustion chamber. The continued flow of compressed gases to the main combustion chamber after ignition therein advantageously permits a period of constant pressure combustion.

By virtue of the novel formation of the rotors and the housing, the burning expanding gases in the main combustion chamber formed by cooperation of an intermeshing, rotating pair of rotors and the housing initially apply a driving torque, through a progressively increasing moment arm, to one rotor of the pair while the other rotor functions, in effect, as a pressure balanced rotary divider and abutment against which the expanding gases react and subsequently apply a driving torque to said other rotor of the pair while said one rotor functions, in effect, as a pressure balanced rotary divider and reaction abutment. Thus the energy of each power pulse in a combustion chamber is advantageously applied successively in separate parts to each rotor of the pair forming the chamber. This transfer of applied torque occurs without interuption of the application of torque to the power output shaft.

A further advantageous feature of the invention resides in the fact that during a major portion of the compression function of the rotors, including an initial portion of a combustion function, said other rotor functions to simultaneously permit and induce the inflow of a fresh charge of combustion supporting gases to the space which later becomes the compression volume for the succeeding cycle. The relative maximun sizes of the combustion and compression volumes and hence the relationship of the expansion and compression ratios may be readily varied by selective circumferential location of the combined exhaust-inlet port 52. The disclosed novel rotor-housing combination also makes it possible to make optional advantageous use of high temperature, partially burned residual gases from one combustion cycle in the succeeding combustion cycle without the provision of supplemental equipment.

Although only a limited number of embodiments and variations have been illustrated in the drawings and specifically described in the foregoing specification, it is to be expressly understood that the invention is not limited thereto. Many changes may be made in the specific arrangement and design of the parts illustrated without departing from the spirit and scope of the invention, as will now be apparent to those of ordinary skill in the art.

What is claimed is:

1. Apparatus of the class described comprising a hollow housing comprising a tube-like central casing and end closure means for the ends thereof, first and second intermeshing rotors with spaced parallel axes interposed between and rotatably supported by said end closure means and circumferentially surrounded by said central casing, said first rotor comprising a cylindrical hub portion and a radially-extending piston portion having oppositely-facing, radially-extending concave reaction surfaces and said second rotor comprising a cylindrical hub portion and a radially-extending piston portion having oppositely-facing radially-extending convex reaction surfaces, means including said second rotor for inducting a gaseous charge into the housing around the hub portion of said second rotor, and means for drivably connecting said rotors whereby the same are constrained to rotate simultaneously in opposite directions in timed relation, the circumferential surfaces of said rotors and the inner walls of said housing being formed to cooperate so that during each revolution of said first rotor a freshly inducted gaseous charge is trapped and initially compressed in a closed compression chamber between the rotors with the first rotor functioning as a fixed reaction surface while the second rotor functions as a piston to progressively reduce the volume of said chamber and is thereafter further compressed between the rotors with said second rotor functioning as a fixed reaction surface while the first rotor functions as a piston to further progressively reduce the volume of said chamber.

2. Apparatus as defined in claim 1 wherein, during said further compression of the gaseous charge, said compression chamber is progressively reduced to a tubular chamber between the rotors formed solely by opposed surfaces of the rotors and said end closure means.

3. Apparatus as defined in claim 1 wherein said rotors also cooperate while said first rotor is thus functioning as a piston, to form an expansible chamber between the rotors enclosed solely by opposed surfaces of said rotors and said end closure means and to thereafter progressively expand said expansible chamber to one enclosed by opposed surfaces of said rotors, said end closure means and the wall of said casing.

4. Apparatus as defined in claim 3 comprising means for conducting a compressed gaseous medium from said compression chamber as it is progressively contracted into said expansible chamber as it is progressively expanded during rotation of the rotors.

5. In apparatus of the class described, a housing comprising at least two adjoined segmental cylindrical portions which communicate through a passage bounded on two sides by the parallel edges of apexes at the junctions of the internal walls of said segmental cylindrical housing portions, a rotor in each said portion, means constraining said rotors to rotate in opposite directions in timed relation to each other, one said rotor in one said housing portion comprises a hub portion and at least one radially extending piston portion adapted to project into the other said housing portion and having a segmental cylindrical outer surface and convexly curved leading and trailing, radially-extending reaction surfaces, whereby the latter and said outer surface converge to form obtuse-angle apexes at the leading and trailing edges of said piston portion, the linear distance between said apex edges of said piston portion being approximately equal to the distance between said parallel apex edges bordering said passage, and the other said rotor in the other said housing portion having a surface recess therein to receive said piston portion during rotation of the rotors, the surface of said recess consisting of a central convex, segmental cylindrical surface portion having a close running relation with said outer surface of said piston portion and a concave reaction surface portion at each side of said central convex portion so curved that the leading and trailing concave reaction surface portions have close running relation, respectively, with said leading and trailing apex edges of said piston portion.

6. Apparatus as defined in claim 5 wherein said concave reaction surfaces of said recess and the outer peripheral surface of said other rotor form acute angle apexes at the leading and trailing edges of said recess, and the leading and trailing convex reaction surfaces on said piston portion are curved to have close running relation throughout the whole extent thereof with said leading and trailing apex edges, respectively, of the recess, the distance between the apex edges of the recess being approximately equal to the distance between said parallel apex edges bordering said passage.

7. In apparatus of the class described, a hollow housing having communicating first and (at least one) second segmental cylindrical chambers with parallel axes and a common chordal plane (a-a) subtending the internal segmental cylindrical walls thereof, a first rotor rotatably supported in and coaxial with the first chamber and comprising a cylindrical hub portion having a radius appreciably less than the radius of said first chamber and at least one radially extending piston portion having an outer segmental cylindrical surface which is coaxial with and has a radius but slightly less than that of said first chamber and oppositely-facing, radially-extending, convexly-curved reaction surfaces, and at least one second rotor rotatably supported in and coaxial with said second chamber and comprising a cylindrical hub portion having a close running clearance with said outer segmental cylindrical surface of said piston portion of the first rotor and a radially extending piston portion having an outer segmental cylindrical surface which is coaxial with and has a radius but slightly less than that of said second chamber and opposite-facing, radially-extending, concavely-curved reaction surfaces, whereby the rotors intermesh when the same are simultaneously rotated in opposite directions in timed relation to each other, the chordal planes subtending said outer segmental cylindrical surfaces of said rotors being of the same shape and size and of approximately the same shape and size as said common chordal plane, said planes being approximately coplanar and in registry when the piston portion of the first rotor is fully meshed with said second rotor (FIG. 4).

8. Apparatus as defined in claim 7 wherein the apex at the junction of the leading concave reaction surface and said outer segmental cylindrical surface of the piston portion of the second rotor has a close running engagement with the entire trailing convex reaction surface of the piston portion of the first rotor when the rotors are simultaneously rotated in opposite directions.

9. Apparatus as defined in claim 8 wherein the apex at the juncture of the trailing concave reaction surface and said outer segmental cylindrical surface of the piston portion of the second rotor has a close running engagement with the entire leading convex reaction surface of the piston portion of the first rotor when the rotors are simultaneously rotated in opposite directions.

10. Apparatus as defined in claim 7 wherein the apex at the juncture of the leading convex reaction surface and said outer segmental cylindrical surface of the piston portion of the first rotor has a close running engagement with entire trailing concave reaction surface of the piston portion of the second rotor when the rotors are simultaneously rotated in opposite directions.

11. Apparatus as defined in claim 10 wherein the apex at the juncture of the trailing convex reaction surface and said outer segmental cylindrical surface of the piston portion of the first rotor has a close running engagement with the entire leading concave reaction surface of the piston portion of the second rotor when the rotors are simultaneously rotated in opposite directions.

12. Apparatus as defined in claim 7 wherein the outer segmental cylindrical surface of the piston portion of the first rotor makes close sliding-rolling engagement with the exposed surface of said hub portion of the second rotor between said concave reaction surfaces of the piston portion of said second rotor when the rotors are rotated in opposite directions.

13. Apparatus as defined in claim 7 wherein the outer segmental cylindrical surface of the piston portion of the second rotor makes close rolling engagement with the exposed peripheral surface of the hub portion of said first rotor between said convex reaction surfaces of the piston portion of said first rotor.

14. In apparatus of the class described, a housing, at least two intermeshing rotors in said housing, means for drivably connecting said rotors whereby the latter are constrained to rotate in opposite directions in predetermined timed relation to each other, the peripheral contours of said rotors being such as to form, during rotation thereof, an expanding combustion chamber initially enclosed solely by opposed surfaces of the rotors and the end closure walls of the housing and a contracting compression chamber in the housing between opposing surfaces of the rotors, and means controlled by the rotors for connecting said chambers to effect the flow of gases directly from said compression chamber to the combustion chamber while the same are simultaneously contracting and expanding, respectively.

15. Apparatus as defined in claim 14 comprising means for igniting a combustible charge in either of said chambers.

16. Apparatus as defined in claim 14 wherein said rotors cooperate to initiate formation of said combustion chamber from a zero volume independently of the compression chamber while gases are being compressed in said compression chamber.

17. In a rotary internal combustion engine, a housing, intermeshing rotors in said housing, and means for constraining said rotors to rotate in timed relation in opposite directions, said rotors cooperating during rotation thereof to form an expanding main combustion chamber between opposed surfaces of the rotors and a contractible pre-combustion chamber between opposed surfaces of the rotors, to compress a gaseous medium in said pre-combustion chamber independently of the main combustion chamber and to control communication between said chambers and the flow of gases from said contracting pre-combustion chamber into the main combustion chamber.

18. Apparatus as defined in claim 17 comprising means for igniting a combustible charge in said pre-combustion chamber.

19. Apparatus as defined in claim 7 comprising a plurality of rotors and chambers corresponding to said second rotor and said second chamber, respectively, circumferentially spaced around said first rotor and said first chamber, each of said second rotors being angularly positioned to operatively intermesh with said first rotor during rotation thereof.

20. Apparatus as defined in claim 19 wherein said first rotor has a plurality of circumferentially spaced piston portions, each adapted to operatively intermesh with each of said plurality of second rotors.

21. Apparatus as defined in claim 14 comprising means for directing gases under pressure from the contracting compression chamber into the combustion chamber through clearance spaces between the rotors and the housing to thereby resist leakage of gases from said combustion chamber through said spaces.

22. The method which comprises rotating intermeshing rotors in a housing to cyclically form therein an expanding combustion volume and a simultaneously contracting compression volume, establishing communication between said volumes as the same expand and contract, flowing a gaseous combustion supporting medium under pressure from said contracting compression volume into said expanding combustion volume, injecting a combustible fuel into the compression and combustion volumes, and igniting the resulting combustible mixture in said volumes.

23. A method as defined in claim 22 wherein the ignition of the combustible mixture in the compression volume precedes the ignition of the mixture in the combustion volume.

24. The method which comprises rotating intermeshing rotors in a housing to form therein an expanding combustion volume and a simultaneously contracting compression volume, supplying a combustible fuel-air mixture to said compression volume, compressing the mixture, flowing part of the compressed mixture from the contracting compression volume into the expanding combustion volume, and igniting said compressed mixture in said compression volume.

25. In rotary apparatus of the class described, a hollow housing comprising a central casing and end closure means therefor, first and second intermeshing rotors with spaced parallel axes interposed between and rotatably supported by said end closure means and circumferentially surrounded by said central casing, means for drivably connecting said rotors whereby the same are constrained to rotate simultaneously in opposite directions in timed relation, the circumferential surfaces of said rotors and the inner wall of said housing being so formed as to cooperate during a part of each revolution of said first rotor to form an expansible chamber that is initially enclosed solely by opposed surfaces of said rotors and said end closure means and thereafter enclosed by opposed surfaces of said rotors, said end closure means and the inner wall of said casing, and means for introducing a gaseous medium under pressure into said chamber, whereby said gaseous medium initially applies a resultant torque only to said first rotor while reacting against said second rotor as a fixed abutment and thereafter applies a resultant torque only to said second rotor while reacting against said first rotor as a fixed abutment.

26. In apparatus of the class described, a hollow housing comprising a primary segmental cylindrical chamber and at least one secondary segmental cylindrical chamber, the axis of the primary chamber being parallel to the axis of the secondary chamber and spaced therefrom a distance less than the sum of the radii of the two chambers, a rotor rotatably mounted in and coaxial with each of said chambers, each said rotor comprising a cylindrical hub portion and a radially extending piston portion having opposed, generally radially-extending reaction surfaces and a segmental cylindrical outer surface which is concentric with and has a close running clearance with the wall of the chamber in which it is mounted, and the sum of the radius of the hub portion of the first of said rotors and the radius of the outer surface of the piston portion of the second of said rotors being approximately equal to the distance between said chamber axes, said reaction surfaces of the piston portion of one of said rotors being arcuately convex and said reaction surfaces of the other rotor being arcuately concave and forming acute angle apexes at the intersections thereof with said outer segmental cylindrical surface of the piston portion of the said other rotor, the distance between said apexes being approximately equal to the chord subtending the segmental cylindrical outer surface of the piston portion of said one rotor and, when the rotors rotate in timed relation in opposite directions, one said apex closely follows one of said convex reaction surfaces of said one rotor and the other said apex closely follows the other convex reaction surface of said one rotor during selected parts of each rotor revolution.

27. In apparatus of the class described, a hollow housing, a first rotor in the housing having an axially-extending recess in the periphery thereof, and a second, rotor in said housing having at least one axially-extending, radially-projecting vane adapted to mesh with said recess during rotation of said rotors in predetermined timed relation in opposite directions, said rotors cooperating during such rotation thereof to repetitively form within said housing between the rotors a closed contracting compression volume, to repetitively reduce said volume to zero value and to repetitively create from zero a closed expanding chamber, independent of the compression volume, in the housing between the rotors while contracting the compression volume.

28. Apparatus as defined in claim 25 comprising means for igniting a combustible gaseous medium in said expansible chamber.

29. Apparatus as defined in claim 25 comprising means for injecting a combustible fuel into said expansible chamber.

* * * * *